United States Patent [19]

Nakao

[11] Patent Number: 5,389,124
[45] Date of Patent: Feb. 14, 1995

[54] METHOD FOR THE RECOVERY OF GOLD VALUE

[75] Inventor: Yukimichi Nakao, Ibaraki, Japan

[73] Assignee: Japan, as represented by Director General of Agency of Industrial Science and Technology, Japan

[21] Appl. No.: 207,075

[22] Filed: Mar. 8, 1994

[30] Foreign Application Priority Data

Jun. 18, 1993 [JP] Japan .................... 5-172666

[51] Int. Cl.6 .............................. C22B 3/20
[52] U.S. Cl. ............................. 75/722; 423/39
[58] Field of Search ...................... 75/722; 423/39

[56] References Cited

U.S. PATENT DOCUMENTS 5,139,752  8/1992  Nakao et al. ................ 75/722

*Primary Examiner*—Melvyn J. Andrews
*Attorney, Agent, or Firm*—Wenderoth, Lind & Ponack

[57] ABSTRACT

An efficient method is proposed for the recovery of gold value from a waste material containing scrap gold by utilizing a principle that metallic gold can be dissolved at elevated temperatures and specifically precipitated at low temperatures with good reversibility in and out of a specific unique liquid medium which is an organic solvent, e.g., acetonitrile, containing an ionic compound of a first halogen, e.g., quaternary ammonium halides, and an elementary form of a second halogen each in a specified concentration, of which at least either one of the first and second halogens is iodine. Namely, a gold-containing waste material is contacted at a high temperature with the liquid medium to have the gold value dissolved therein and the gold-containing solution is then cooled to a low temperature so that the gold value can be recovered in the form of precipitates in a high purity.

9 Claims, No Drawings

METHOD FOR THE RECOVERY OF GOLD VALUE

BACKGROUND OF THE INVENTION

The present invention relates to a method for the recovery of gold value from various source materials containing gold in a low content by separating from other foreign metallic ingredients to isolate gold in a relatively high purity.

Needless to say, gold is the most valuable precious metal and not only is used traditionally as a material of a wide variety of ornamental goods but also is used recently as a key material in various kinds of electronic devices and instruments. It is unavoidable in the manufacturing process of these ornamental goods and electronic items using gold as a part that scraps of gold-made parts are produced more or less as a waste material mainly consisting of other less valuable metallic materials. In addition, as a consequence of the remarkably rapid progress of the technology of electronics, many of the electronic instruments are necessarily replaced with a new model after a relatively short time of use so that the amount of gold value contained in the obsolete and discarded instruments is also rapidly increasing year by year. In view of the outstanding expensiveness of gold as a precious metal, it is a very important industrial problem to develop an efficient method for the recovery of gold value from those waste materials of low gold content in a purity sufficiently high for the reuse of the gold metal.

One of the conventional methods for the recovery of gold value from waste materials is to dissolve the gold value in aqua regia or in an aqueous solution of a cyanide compound saturated with air blown thereinto followed by reduction of the gold ions into a metallic form. These methods, however, are not quite satisfactory as an industrial method because aqua regia and cyanide compounds are notoriously harmful or toxic against human body involving a serious problem on the workers' health or heavy environmental pollution.

A proposal is recently made in Japanese Patent Kokai No. 4-6229 and No. 4-21726 on a method for the recovery of gold value without using such a harmful material, in which the gold value in waste materials is dissolved in an organic solvent containing halogen in an elementary form and a halogen compound followed by re-precipitation of gold therein by the reduction with a reducing agent such as zinc dust, sodium borohydride and the like.

This method is also disadvantageous because the gold value dissolved in the medium can be precipitated only by undertaking the reducing reaction so that the process is very complicated. Moreover, the use of a reducing agent means production of a large amount of by-products therefrom as a contaminant of the recovered gold value which must be subjected to a further purification treatment in order to be in a high purity of gold suitable for reuse.

SUMMARY OF THE INVENTION

The present invention accordingly has an object to provide an efficient and simple method for the recovery of gold value from waste materials containing gold in a minor content without the problems and disadvantages in the above described prior art methods, by which the gold value can be recovered in the metallic form of a high purity suitable for reuse without further purification.

Thus, the method of the present invention for the recovery of gold value from a material containing gold value comprises the steps of:

(a) contacting the material containing gold value with a liquid medium which is an organic solvent containing, as dissolved therein, an ionic halogen compound of a first halogen and a second halogen in the elementary form in an amount of at least 50% by moles based on the ionic halogen compound, at least either one of the first and second halogens being iodine, at a first temperature to dissolve the gold value therein to form a gold-containing solution;

(b) decreasing the temperature of the gold-containing solution to a second temperature which is substantially lower than the first temperature to precipitate the gold value in a metallic form; and (c) separating the precipitated gold value in the metallic form from the liquid medium.

In particular, it is preferable that the ionic compound of the first halogen is selected from the group consisting of metal halides, ammonium halides and halogen salts of a quaternary compound and the organic solvent is selected from the group consisting of nitrile compounds, alcohols, esters, nitro compounds and aromatic hydrocarbon compounds with the proviso that the halogen compound is soluble in the organic solvent.

DETAILED DESCRIPTION OF THE PREFERRED EMBODIMENTS

As is described above, the very scope of the inventive method consists in the use of a specific liquid medium in which metallic gold contained in a waste material can be dissolved to form a gold-containing solution and, when the temperature of the solution is substantially decreased, the gold value in the solution is precipitated in a metallic form which can be readily separated and recovered from the solution while other metals such as palladium, copper, nickel, zinc and the like can be dissolved in the same liquid medium together with the gold value but they are never precipitated in the solution by the decrease in the temperature of the solution.

The liquid medium in which the gold value is dissolved is a solution of an organic solvent containing an ionic halogen compound of the first halogen and a second halogen in the elementary form in combination. Though not particularly limitative provided that the elementary halogen and halogen compounds can be dissolved therein, the organic solvent is selected, in consideration of the solubility behavior of the elementary halogens and ionic halogen compounds, from the group consisting of nitrile compounds such as acetonitrile and propionitrile, alcohols such as methyl alcohol, ethyl alcohol, ethyleneglycol and propyleneglycol, esters such as ethyl acetate, ethyl propionate and ethyl lactate, nitro compounds such as nitromethane and nitroethane and aromatic hydrocarbon compounds such as benzene. These organic solvents can be used either singly or as a mixture of two kinds or more according to need.

The halogen in the elementary form as one of the solutes dissolved in the organic solvent is selected from the group consisting of chlorine, bromine and iodine, of which bromine and iodine are or, in particular, iodine is preferred in respect of the easiness in handling and in consideration of the requirement that at least either one of the first and the second halogens must be iodine. When the first halogen forming the ionic halogen compound jointly dissolved in the organic solvent is not iodine, the elementary halogen must be iodine since at least either one thereof must be iodine. These halogens in the elementary form usually have good solubility in most of organic solvents.

The first halogen forming the ionic halogen compound to be dissolved in the organic solvent can be chlorine, bromine or iodine but must be iodine when the second halogen in the elementary form is not iodine. Examples of suitable ionic halogen compounds include metal halides such as sodium chloride, potassium chloride, sodium bromide, potassium bromide, sodium iodide, potassium iodide, magnesium chloride, magnesium bromide and magnesium iodide, ammonium halides such as ammonium chloride, ammonium bromide and ammonium iodide and halogen-containing quaternary compounds such as tetramethylammonium chloride, tetraethylammonium chloride, tetrapropylammonium chloride, tetrabutylammonium chloride, N-methylpyridinium chloride, N-ethylpyridinium chloride, N-butylpyridinium chloride, N-cetylpyridinium chloride, N-methylquinolinium chloride, N-ethylquinolinium chloride, N-butylquinolinium chloride and N-cetylquinolinium chloride as well as bromine compounds and iodine compounds corresponding to these chlorine compounds. These halogen compounds can be used either singly or as a combination of two kinds or more according to need with consideration of the solubility behavior in organic solvents.

The concentrations of the elementary halogen and the ionic halogen compound should be each at least 1 mmole/liter or, preferably, in the range from 5 to 500 mmoles/liter. It is essential in the inventive method that the concentration of the elementary halogen is at least 50% by moles of the ionic halogen compound. The above mentioned amount of the ionic halogen compound refers to the amount of halogen ions and the amount of the elementary halogens is given assuming that two halogen atoms form a halogen molecule. When the concentration of the elementary halogen is too low relative to the ionic halogen compound, precipitation of the gold value dissolved in the liquid medium would be incomplete by the decrease in the temperature so as to adversely affect the recovery yield of the gold value.

When a waste material containing scrap gold is brought into contact with the above described liquid medium or immersed therein, the scrap gold is dissolved in the liquid medium forming a solution containing the gold value although other metals, if any, such as palladium, copper, nickel, zinc and the like are also dissolved. Since the gold value contained in the solution is precipitated by decreasing the temperature of the solution, it is natural that the temperature of the liquid medium contacted with the scrap gold is kept at an elevated temperature or, preferably, at a temperature at or near the refluxing temperature of the liquid medium.

After removal of the undissolved materials from the gold value-containing solution, the solution is cooled or chilled to a temperature as low as possible in consideration of the cost therefor so that the gold value is precipitated in the metallic form. The temperature at which the gold value is precipitated can be room temperature or lower in order to obtain effective precipitation of the gold value. The precipitates of metallic gold in the solution can readily be recovered by a conventional solid-liquid separating means such as decantation, filtration, centrifugation and the like. It is noteworthy that precipitation of gold value by decreasing the temperature of the solution is specific to gold and other metals, if any, dissolved in the same liquid medium are never precipitated by the temperature decrease so that separation of gold value from other impurity metals is complete.

The phenomenon of dissolution and precipitation of the gold value in the specific liquid medium is completely reversible between high and low temperatures and precipitation of the gold value in the solution by decreasing the temperature cannot be complete so that it is economically advantageous that the filtrate or the mother liquor in which the precipitation of the gold value has been obtained is repeatedly used by introducing another lot of a waste material containing scrap gold at an again increased temperature in order to fully utilize the unprecipitated portion of the gold value.

In the following, the method of the present invention is described in more detail by way of examples.

EXAMPLE 1

A gold wire having a diameter of 0.2 mm and weighing 235 mg was added to a solution prepared by dissolving 0.257 g (1 mmole) of tetraethylammonium iodide and 0,254 g (1 mmole) of elementary iodine ($I_2$) in 10 g of acetonitrile and the solution containing the gold wire was heated under reflux for 24 hours with continuous agitation to establish a condition of saturation so that a weight decrease of 83.8 mg was found in the gold wire taken out of the still hot solution, washed with methyl alcohol and dried due to dissolution in the liquid medium. The thus obtained solution containing the gold value dissolved therein was cooled to 20° C. and kept overnight at this temperature to find precipitates of gold in the solution. The amount of the precipitates of gold was 32.6 mg after washing with methyl alcohol and drying.

EXAMPLE 2

The experimental procedure was substantially the same as in Example 1 excepting replacement of the tetraethylammonium iodide with the same molar amount (0.150 g) of sodium iodide. The amount of the dissolved gold wire was 79.4 mg and the amount of the recovered gold precipitates was 27.2 mg.

EXAMPLE 3

The experimental procedure was substantially the same as in Example 1 excepting replacement of the tetraethylammonium iodide with the same molar amount (0.45 g) of ammonium iodide. The amount of the dissolved gold wire was 86.3 mg and the amount of the recovered gold precipitates was 26.5 mg.

EXAMPLE 4

The experimental procedure was substantially the same as in Example 1 excepting replacement of the acetonitrile with the same amount of ethyl acetate and the tetraethylammonium iodide with the same molar amount (0.369 g) of tetrabutylammonium iodide. The amount of the dissolved gold wire was 96.7 mg and the amount of the recovered gold precipitates was 17.7 mg.

EXAMPLE 5

The experimental procedure was substantially the same as in Example 1 excepting replacement of the acetonitrile with the same amount of nitromethane. The amount of the dissolved gold wire was 100.2 mg and the amount of the recovered gold precipitates was 16.6 mg.

EXAMPLE 6

The experimental procedure was substantially the same as in Example 1 excepting replacement of the acetonitrile with the same amount of benzene and the tetraethylammonium iodide with the same molar amount (0.431 g) of cetylpyridinium iodide and the temperature to effect precipitation of gold was 30° C. instead of 20° C. The amount of the dissolved gold wire was 104.4 mg and the amount of the recovered gold precipitates was 7.4 mg.

EXAMPLE 7

The experimental procedure was substantially the same as in Example 1 excepting replacement of the acetonitrile with the same amount of methyl alcohol and the tetraethylammonium iodide with the same molar amount (0.369 g) of tetrabutylammonium iodide and the temperature to effect precipitation of gold was 40° C. instead of 20° C. The amount of the dissolved gold wire was 91.4 mg and the amount of the recovered gold precipitates was 6.0 mg.

EXAMPLE 8

A gold wire of 0.2 mm diameter weighing 235 mg was introduced into the liquid medium after recovery of the gold precipitates in Example 1 and the liquid medium was heated under reflux with agitation for 24 hours. The weight decrease in the gold wire taken out of the still hot liquid medium was 33.7 mg. The liquid medium after removal of the undissolved gold wire was cooled to 20° C. and kept overnight to obtain 31.2 mg of a gold powder as precipitated.

EXAMPLE 9

The experimental procedure was substantially the same as in Example 1 excepting replacement of the tetraethylammonium iodide with the same molar amount (0.166 g) of tetraethylammonium chloride and the temperature to effect precipitation of the gold value was 12° C. instead of 20° C. The amount of the dissolved gold wire was 57.0 mg and the amount of the recovered gold precipitates was 25.8 mg.

EXAMPLE 10

The experimental procedure was substantially the same as in Example 9 excepting replacement of the tetraethylammonium chloride with the same molar amount (0.210 g) of tetraethylammonium bromide. The amount of the dissolved gold wire was 63.1 mg and the amount of the recovered gold precipitates was 27.3 mg.

EXAMPLE 11

The experimental procedure was substantially the same as in Example 1 excepting replacement of the elementary iodine with the same molar amount (0.160 g) of bromine and the temperature to effect precipitation of the dissolved gold value was 10° C. instead of 20° C. The amount of the dissolved gold wire was 65.2 mg and the amount of the recovered gold precipitates was 27.4 mg.

What is claimed is:

1. A method for the recovery of gold value from a material containing gold value which comprises the steps of:
   (a) contacting the material containing gold value with a liquid medium which is an organic solvent containing, as dissolved therein, an ionic halogen compound of a first halogen and a second halogen in the elementary form in an amount of at least 50% by moles based on the ionic halogen compound, at least either one of the first and second halogens being iodine, at a first temperature to dissolve the gold value therein to form a gold-containing solution;
   (b) decreasing the temperature of the gold-containing solution to a second temperature which is substantially lower than the first temperature to precipitate the gold value in a metallic form; and
   (c) separating the precipitated gold value in the metallic form from the liquid medium.

2. The method for the recovery of gold value as claimed in claim 1 in which the ionic halogen compound is selected from the group consisting of metal halides, ammonium halides and halogenated quaternary compounds.

3. The method for the recovery of gold value as claimed in claim 1 in which the organic solvent is selected from the group consisting of nitrile compounds, alcohols, esters, organic nitro compounds and aromatic hydrocarbon compounds.

4. The method for the recovery of gold value as claimed in claim 1 in which the concentration of the ionic halogen compound in the liquid medium is in the range from 5 to 500 mmoles/liter relative to the halogen ions.

5. The method for the recovery of gold value as claimed in claim 1 in which the concentration of the halogen in the elementary form in the liquid medium is in the range from 5 to 500 mmoles/liter.

6. The method for the recovery of gold value as claimed in claim 1 in which the first temperature at which the gold value is dissolved in the liquid medium is the refluxing temperature of the liquid medium.

7. The method for the recovery of gold value as claimed in claim 1 in which the second temperature at which the gold value is precipitated in the liquid medium is room temperature or lower.

8. The method for the recovery of gold value as claimed in claim 1 in which each of the first and second halogens is selected from the group consisting of chlorine, bromine and iodine.

9. The method for the recovery of gold value as claimed in claim 8 in which each of the first and second halogens is bromine or iodine.

* * * * *